US005376205A

United States Patent [19]

Drake

[11] Patent Number: 5,376,205

[45] Date of Patent: Dec. 27, 1994

[54] RECORD BOOK OR PAD

[75] Inventor: Thomas R. Drake, Epsom Downs, Great Britain

[73] Assignee: Drakes Office Systems Limited, Surrey, United Kingdom

[21] Appl. No.: 138,809

[22] Filed: Oct. 19, 1993

Related U.S. Application Data

[62] Division of Ser. No. 949,423, Sep. 22, 1992, Pat. No. 5,275,576.

[30] Foreign Application Priority Data

Oct. 8, 1991 [GB] United Kingdom ................. 9121376

[51] Int. Cl.[5] ............................ B41L 1/24; B32B 7/00

[52] U.S. Cl. .................................... 156/240; 156/289; 281/16; 283/52.1; 283/63.1; 462/9; 462/21; 412/1

[58] Field of Search ................. 156/64, 289, 252, 240; 428/914; 462/9, 57, 21; 281/16; 283/50-52.1; 412/1

[56] References Cited

U.S. PATENT DOCUMENTS 685,151 10/1901 Landing ............................ 282/23 R
4,036,511 7/1977 Maalouf ......................... 282/27.5 X
4,368,903 1/1983 Jones .............................. 156/289 X
4,533,160 8/1985 Malone ............................ 282/23 R
4,714,276 12/1987 Greig ............................... 283/63 R
4,798,401 1/1989 Greig ................................. 282/9 R
4,934,740 6/1990 Drake ................................ 282/8 R
5,248,164 4/1992 Lepetre ............................ 281/22 X
5,251,936 10/1993 Fitzgibbons ......................... 283/58

*Primary Examiner*—Michael W. Ball
*Assistant Examiner*—Charles Rainwater

[57] ABSTRACT

A record book or pad and a method of manufacturing such a book or pad has a stack of sheets in sets A. Each set A consists of a primary sheet P disposed between secondary sheets OS and US. Both faces of the sheet P are provided with a reactive coating 4 of duplicating material and each face of the secondary sheets OS and US which opposes the primary sheet P in the set is provided with reactive coatings 5 of duplicating material. When a marking is applied to the sheet OS for recording a message, pressure from that marking transfers through the sheet OS causing the coatings 4 and 5 between the sheets OS and P to inter-react and form a duplicate marking on a one face of the sheet P. Similarly when a marking is applied to the secondary sheet US, pressure from that marking transfers through the sheet US causing the coatings 4 and 5 between sheet P and US to inter-react and form a duplicate of the marking on the second face of the sheet P. The sheets OS and US may be removed from the book by tearing along perforations 10 and such removed portions may carry low tack adhesive 21. Low tack adhesive 22 may be provided on the secondary sheets OS and US to contact the primary sheet P in the respective sets along the spine part 2 of the book.

15 Claims, 2 Drawing Sheets

RECORD BOOK OR PAD

This patent¯ is a divisional of U.S. Ser. No. 07/949,423, filed Sep. 22, 1992, now U.S. Pat. No. 5,275,576.

TECHNICAL FIELD AND BACKGROUND ART

The present invention relates to a record book or pad and is primarily concerned with such a book or pad for duplicating in which a copy of an impression or marking, such as a message, applied by pressure on one sheet is formed on an adjacent underlying sheet, typically to provide a record of the marking if one of the aforementioned overlying sheets is removed from the book or pad following use. Books or pads having record sheets and removable sheets in overlying relationship and which are disposed alternately to provide pairs each with one record sheet and one removable sheet are well known. An example is a telephone message book where a manuscript note of a telephone conversation is applied to an upper removable sheet of a pair for Chat note to be reproduced or duplicated on the underlying record sheet of the pair following which the removable sheet is removed, usually by tearing along a line of weakness on that sheet while a record of the message is retained in the book.

To provide the transfer of the marking from the record sheet to the removable sheet (or vice versa), a sheet of carbon paper was conventionally inserted between the two sheets in well known manner. However, it is now widely considered that the use of carbon paper for the aforementioned purpose is obsolete and so-called carbonless paper is preferred in which a face of a duplicating sheet is coated in a manner known in the art with a duplicating material which responds to pressure from a mark or impression applied thereto through an overlying sheet so that a copy of that mark as reproduced on the appropriately coated face of the underlying duplicating sheet. Generally, and simplistically, the known coating for a duplicating sheet comprises minute capsules or bubbles which break or burst (in response to the localised pressure applied through an overlying sheet and created by the aforementioned marking on the overlying sheet) causing an agent to be released which develops the copy of the marking.

One known form of duplicating book or pad using carbonless paper has its sheets collated in pairs, each pair consisting of a top sheet and an adjacent underlying duplicating sheet. Each of these sheets has its face which abuts and opposes the adjacent face of the sheet in its pair, coated with the aforementioned duplicating material and when a mark or impression is applied to the top sheet for localised pressure from the marking to be transferred through that top sheet onto the underlying duplicating sheet, capsules burst in the respective coatings on the abutting faces between the sheets in the pair causing respective agents to be released and these agents inter-react to develop a copy of the applied marking on the face of the duplicating sheet. The present invention is primarily concerned with duplicating books or pads of this general form where it is essential that appropriate coatings are applied to each of the opposing faces of the top sheet and duplicating sheet in a pair before a mark or impression applied to the top sheet will be duplicated on the underlying duplicating sheet—this is considered advantageous to alleviate the possibility of confusing copy markings inadvertantly being developed on the coated face of the duplicating sheet through an uncoated overlying top sheet (which is known to occur with another form of carbonless paper known in the art as "action paper").

In the interests of the conservation of the environment there is an ever increasing demand to reduce the consumption of paper and in the stationery industry there is a need to maximise the efficient usage of paper to achieve cost effective maufacture of every day stationery products such as duplicating books or pads of the kind generally discussed above. It is an object of the present invention to provide such a book or pad which lends itself to achieving the aforementioned aims.

STATEMENTS OF INVENTION AND ADVANTAGES

According to the present invention there is provided a record book or pad comprising primary sheets and secondary sheets disposed in overlying relationship with a face of a secondary sheet opposing a face of an adjacent primary sheet, said opposing faces each having a reactive coating of duplicating material whereby when a mark or impression is applied by pressure to the secondary sheet for localised pressure from that marking to transfer through the secondary sheet, said pressure transfer causes the reactive coatings on the adjacent opposed faces of the secondary and primary sheets to inter-react and provide a copy of the mark or impression on the face of the primary sheet, characterised in that the sheets are formed in sets, each set having a primary sheet and two secondary sheets, the primary sheet in a set having both faces thereof provided with said reactive coating and being disposed between the two secondary sheets of its set, the secondary sheets in the set having each of their faces which are adjacent to and oppose the respective faces of the primary sheet in the set provided with said reactive coating so that when a mark is applied by pressure on a first secondary sheet in the set, pressure transfer of that marking through the first secondary sheet causes the reactive coatings between one face of the primary sheet and the opposing face of the first secondary sheet to inter-react and provide a copy of that marking on said one face of the primary sheet and when a mark is applied by pressure on the second secondary sheet in the set, pressure transfer of that marking through the second secondary sheet causes the reactive coating between the second face of the primary sheet and the opposing face of the secondary sheet to inter-react and provide a copy of that marking on the second face of the primary sheet.

Further according to the present invention there is provided a method of manufacturing a record book or pad as specified in the immediately preceding paragraph which comprises applying to sheet material, such as paper, a reactive coating of duplicating material on both faces thereof to provide the primary sheets; applying to further sheet material, such as paper, a reactive coating of duplicating material on a single face thereof to provide the secondary sheets and collating the primary and secondary sheets in said sets to form the book or pad.

By the present invention the record book or pad will usually be formed from a stack of sheets in sets in which each set consists of the primary sheet disposed between two secondary sheets positioned in overlying and underlying relationship respectively with regard to the primary sheet. In this arrangement the primary sheet of a set will have both its upper and lower faces provided with a reactive coating of duplicating material while the overlying secondary sheet is provided with a reactive coating of duplicating material only on its lower face and the underlying secondary sheet is provided with a reactive coating of duplicating material only on its upper face. Consequently localised pressure applied to and through the overlying secondary sheet during marking of that sheet will develop a duplicate or copy of that marking on the upper face of the primary sheet while localised pressure from marking applied to and through the underlying secondary sheet will develop a duplicate or copy of that marking on the lower face of the primary sheet. In this way each primary sheet in the book or pad can serve as a carrier for duplicate copies of, for example, messages which may be written on each of two secondary sheets disposed on opposite sides of the primary sheet. In comparison with conventional duplicating books or pads as previously discussed where sheets are disposed each consisting of a duplicating sheet and an overlying record sheet with opposed adjacent faces between those sheets having the reactive coatings of duplicating material, it will be appreciated that the present invention in having three sheets in each set may be regarded as increasing the sheet requirement by 50% but in doing so will increase the duplicating capacity of the book or pad by 100%. In other words, the record book or pad of the present invention will provide a 25% saving in sheet material, such as paper, for a given duplicating or copying capacity in comparison with a conventional book or pad having the same duplicating or copying capacity.

Suitable reactive coatings of duplicating material which are applied to the faces of the primary sheet and to the appropriate face of each secondary sheet to provide the required duplication on the primary sheet will be well known to those skilled in the art and it will be appreciated that tile chemical and/or physical structure of the reactive coatings on the overlying opposed faces between the primary sheet and a secondary sheet will usually differ on one face as compared to the other. Examples of sheet paper having reactive coatings of duplicating material and which reactive coatings may be applied to the primary and secondary sheets in the sets of the book or pad in accordance with the present invention are marketed under the Trade Name IDEM by Wiggins Teape Carbonless Papers Limited and under the Trade Name SIGNAL by Carrs Papers Limited (it will be appreciated by those skilled in the art that many other examples of reactive coatings are known, such as those provided by Mead Products Inc., and Waterlow Petty).

Preferably the primary sheet in a set provides a record sheet which is intended to be retained in the book or pad while the two secondary sheets of the set are readily removable from the book or pad. Conveniently each secondary sheet includes a line of weakness, such as an array of perforations, by which a portion of the secondary sheet can be torn from the book or pad following use while a marking, such as a message, on that removed portion is exhibited as a duplicate on the underlying face of the primary sheet.

If required the sheets in each set may be gummed together, usually by a light adhesive, adjacent to a common edge to form discrete sets. These gummed sets may be turned individually in the book or pad and permit one or more of the sheets in each set to be readily removed.

Where the secondary sheets or portions thereof are intended to be removable from the book or pad, each such sheet or portion may carry a region of low tack adhesive on its face having the reactive coating which low tack adhesive is appropriately located so that when that sheet (or the portion thereof) is removed from the book or pad it may temporarily be adhered to a remote receptive surface. The characteristics of low tack adhesive on paper sheets is well known in the art and discussed in our British Patent Specification No. 2,214,131. To facilitate the removal of a secondary sheet (or a portion thereof) carrying the low tack adhesive from the primary sheet in its set, the primary sheet may have on its faces a release agent, such as a silicone layer, which is localised to underlie the low tack adhesive.

Preferably the book or pad has a spine part through which the sets of sheets are bound together and the aforementioned line of weakness will usually be located in each secondary sheet to extend parallel with and adjacent to the spine part to facilitate removal of a portion of a secondary sheet following the application of a marking thereto and the development of a copy or duplicate of that marking on the adjacent face of the primary sheet in the relevant set. The spine parts of the sheets in each set may be gummed together to form discrete sets as aforementioned. The binding through the spine part of the sheets may permit the sheets to be turned over individually or in their gummed sets (or parts of sets) sequentially, preferably through 360° into back-to-back relationship with other sheets in the book or pad to successively present secondary sheets for marking. The aforementioned binding through the spine part is preferably a ring binding as is known in the art for turning the sheets into the aforementioned back-to-back relationship although it will be appreciated that other forms of binding may be used such as a spiral binding.

Where the secondary sheets are provided with low tack adhesive on their coated faces and with lines of weakness adjacent to the spine part as previously mentioned, low tack adhesive may be applied to the secondary sheets at regions on both the portion of each secondary sheet which is intended to be removed from the book or pad following use and the portion or stub of the secondary sheet which remains in the spine part so that the low tack adhesive on this latter stub portion adheres to the adjacent primary sheet in its set in a similar manner to the principle discussed in our aforementioned British Patent Specification No. 2,214,131.

For use of the book or pad of the present invention a displaceable barrier sheet such as a relatively thick card or plastics sheet, will usually be provided. Such a barrier sheet is conventional for duplicating books or pads of carbonless paper and is inserted between appropriate sheets in the book to prevent pressure from a marking during duplication from being transferred, inappropriately, through successive underlying sheets from which an unnecessary number or confusing copies could develop.

DRAWINGS

One embodiment of a duplicating book constructed in accordance with the present invention will now be described, by way of example only, with reference to the accompanying illustrative drawings, in which.

DETAILED DESCRIPTION OF DRAWINGS

The book illustrated is typically for recording messages of telephone conversations and is formed with rectangular paper sheets which are stacked in direct overlying relationship and bound together along a common edge by binding rings 1 which pass through a spine part 2 of the book.

The sheets of the book are collated in successive sets A, each set consisting of three sheets, a primary sheet P and two secondary sheets OS and US with the primary sheet P being disposed between and in face-to-face contact with the secondary sheets OS and US in its respective set.

Figure 2:
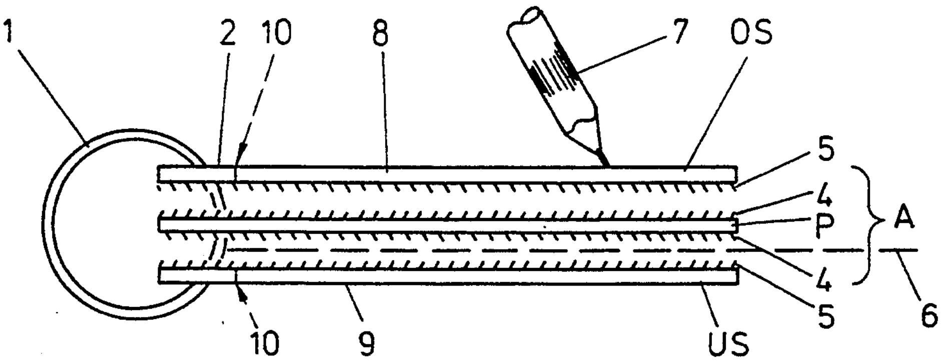
FIG. 2 is an end view of a set of sheets in the book to show, simplistically, how duplication may be achieved between the sheets.

As will be best seen from the simplistic illustration in FIG. 2 where the sheets of a set A are shown, for convenience of description, in spaced relationship, the primary sheet P is provided on each of its faces with a reactive coating 4 of duplicating material while each of the secondary sheets OS and US is provided with a reactive coating 5 of duplicating material solely on its face which is adjacent to and opposes a respective face of the primary sheet P. In use of the sheets in the set A of FIG. 2 for duplicating purposes a barrier sheet 6 of relatively thick card or plastics material is inserted between the primary sheet P and secondary sheet US. With the secondary sheet OS in face-to-face contact with the primary sheet P, a required message or note, typically of a telephone conversation, is applied by a writing instrument 7 to the uncoated face 8 of the secondary sheet OS remote from the primary sheet P. Localised pressure from the writing instrument 7 transfers through the secondary sheet OS to the abutting coatings 4 and 5 between the sheets OS and P so that these coatings inter-react (usually by minute capsules bursting in the respective coatings to release known chemical agents) in the region of the localised pressure and in so doing provide on the face of the primary sheet P which is adjacent to the secondary sheet OS a duplicate or copy of the marking which is applied to the face 8. The chemical and physical structure of the duplicating materials for the respective coatings 4 and 5 necessary to achieve the aforementioned duplication on the face of the primary sheet P is well known in the art; appropriate reactive coatings of duplicating material are provided, for example, on sheets sold under the Trade Mark IDEM by Wiggins Teape Carbonless Papers Limited. During the duplicating or copying exercise between the secondary sheet OS and the primary sheet P, the barrier sheet 6 prevents the pressure of marking on the face 8 of the secondary sheet OS from causing an inter-reaction between the reactive coating 5 on the secondary sheet US and the adjacent reactive coating 4 on the opposed face of the primary sheet P (which inter-reaction could inadvertantly develop a confusing copy on the face of the primary sheet P which opposes the secondary sheet US). Following the application of a marking to the face 8 of the secondary sheet OS in FIG. 2, that sheet can, if required, be removed for presentation remote from the binding rings 1 while a duplicate record of the marking is provided on the primary sheet P. The barrier sheet 6 can now be removed from between the primary sheet P and secondary sheet US. If the secondary sheet OS following its use is not removed from its overlying relationship with the primary sheet P, the barrier sheet 6 will be inserted between the primary sheet P and secondary sheet OS. A further marking or message can now be written or otherwise applied to the uncoated face 9 of the secondary sheet US which is remote from the primary sheet P. The pressure from this latter marking is transferred through the secondary sheet US to provide a localised reaction between the abutting coatings 4 and 5 of the sheets P and US to develop a duplicate or copy of the marking on the face of the primary sheet P which opposes the secondary sheet US. Following use, the secondary sheet US may be removed from the ring binding 1 for presentation as appropriate. It will be apparent that duplicates of messages or other markings applied to the secondary sheets OS and US will, by the structure of the sheets in the set A, be formed as a record on both faces of the primary sheet P. Therefore, in comparison with conventional duplicating books or pads in which the sheets are disposed in pairs with reactive coatings of duplicating material on the opposing faces of the sheets in each pair, it will be realised that the three sheets in the set A shown in FIG. 2 will provide for an equivalent number of duplications as those provided by four sheets in two sets of a conventional record book or pad thereby representing a 25% saving in paper sheet material (or in other words the book or pad in accordance with the present invention and having sheets disposed as set A will provide a 100% increase in duplicating capacity for a 50% increase in the number of sheets as compared with conventional duplicating books or pads).

To facilitate their removal from the binding rings 1 as shown in FIG. 2, the secondary sheets OS and US may be provided with lines of weakness such as perforations 10 extending adjacent to and parallel with the spine part 2. Also the uncoated faces 8 and 9 of the secondary sheets OS and US will likely be over-printed with data appropriate for the intended use of the memo book or pad. The sheets OS, US and P in the set may be gummed together along their common edges or at marginal edge portions within the ring binding 1 so that such sheets (or the remaining parts thereof) may be turned as a set on the ring binding.

Figure 1:
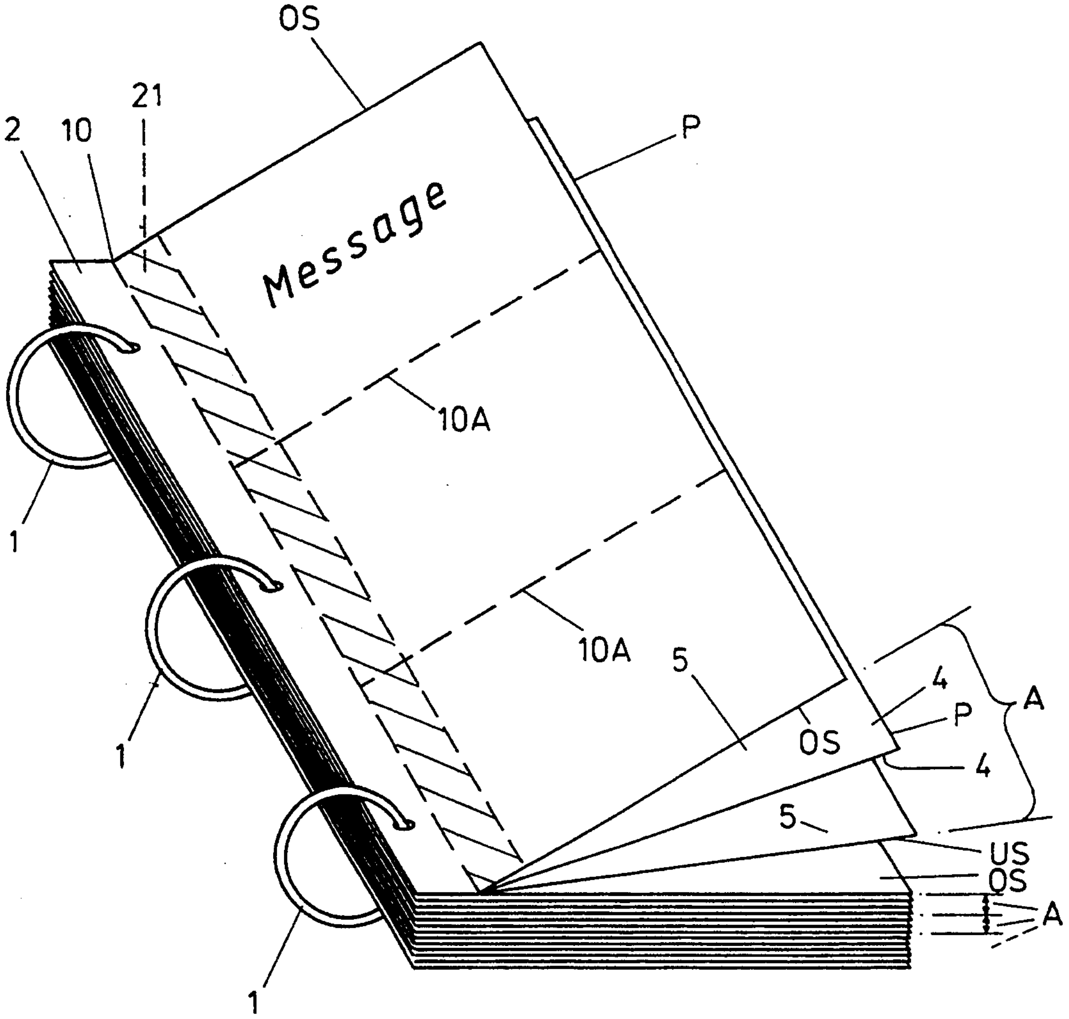
FIG. 1 is a perspective view of the book.

It will be appreciated that in practice the book will have a stack of several sets A as indicated in FIG. 1.

Figure 3:
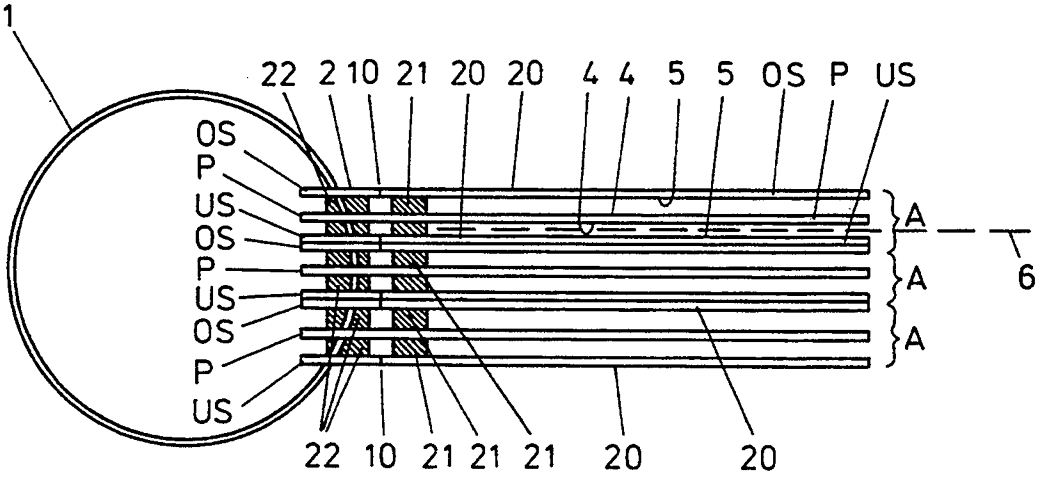
FIG. 3 is an end view of the book modified to include low tack adhesive and with the sheets orientated in the first condition for use.

In the modification which will now be described with reference to FIGS. 3 and 4, the book is shown formed with three sheet sets A (this number being merely for convenience of description). In FIG. 3 each secondary sheet OS and US is provided with a line of weakness 10 adjacent to the spine part 2 so that a removable portion 20 of that sheet may be readily torn from the spine part following use to leave a stub of that sheet in the spine part. Each removable portion 20 of the secondary sheets OS and US carries adjacent to its line of weakness 10 and on its face having the reactive coating 5, a layer of low tack adhesive 21 (the thickness of which is shown generally exaggerated in FIGS. 3 and 4) which contacts the opposing face of the primary sheet P in its respective set A. As indicated in FIG. 1 the low tack adhesive 21 is conveniently applied as a longitudinally extending strip which extends parallel to the spine part 2. If required, each secondary sheet OS and US can also carry a region of low tack adhesive 22 on its face in the spine part 2 which opposes the primary sheet P in its respective set so that the low tack adhesive 22 on each secondary sheet in the spine part contacts the opposing face of the primary sheet of its respective set in the spine part. With this arrangement and as shown in FIG. 3 and with the barrier sheet 6 appropriately located, a message can be written on the uppermost secondary sheet OS to be duplicated on the immediately underlying primary sheet P. The portion 20 of the uppermost secondary sheet OS can now be ripped from the spine part 2 and temporarily adhered by the low tack adhesive 21 which it carries to a remote receptive surface for appropriate presentation while the duplicate of the message is retained in the pad on the primary sheet P. The barrier sheet 6 can now be removed and inserted beneath the next underlying primary sheet P in the stack between that sheet and its adjacent underlying secondary sheet US while the overlying primary sheet and the secondary sheet US in the set of that primary sheet can be turned on the ring binding 1 through 180° (or possibly through 360° on to the bottom of the book into back-to-back relationship with remaining sets in the book). In this way the secondary sheets OS in the sets of the pad can successively be presented for duplicating purposes.

The low tack adhesive 22, if provided, between the spine portions of the sheets in the respective sets permits the sets of sheets (or such sheets as remain in the sets following use together with the spine stubs formed by removed sheet portions 20) to be turned as a unit or set on the ring binding 1.

Figure 4:
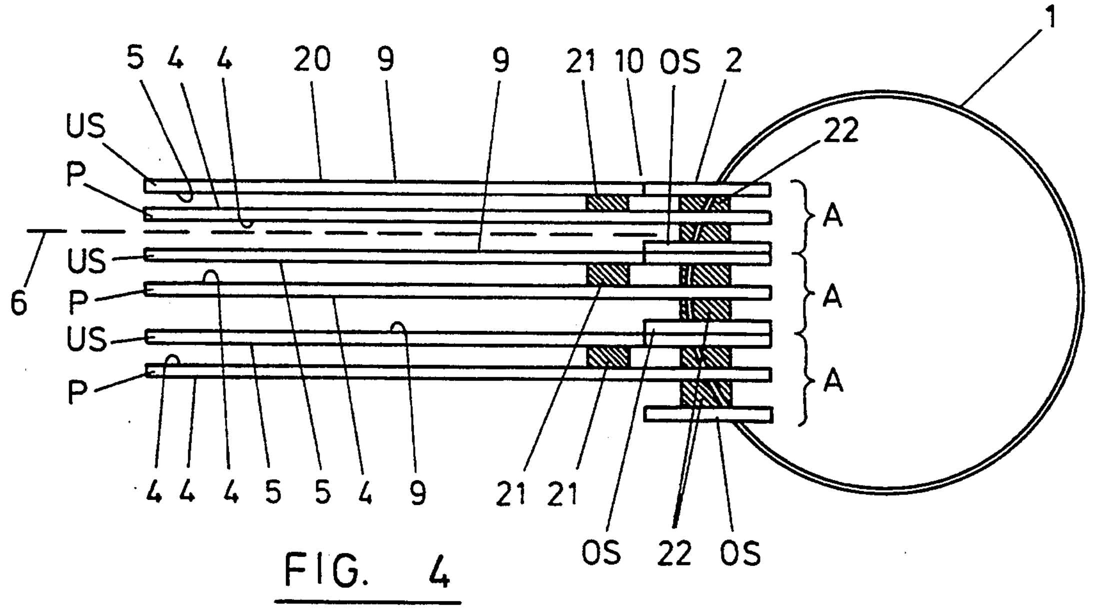
FIG. 4 shows an end view of the book similar to that in FIG. 3 but which has been partly used and its sheets orientated in a second condition for use.

Following successive use of the secondary sheets OS in the stack of sets for the book as shown in FIG. 3 for duplicating purposes and those sets having been turned on the ring binding 1 as previously discussed, the primary sheets p and secondary sheets US together with the stubs remaining in the spine part from the secondary sheets OS can be orientated as shown in FIG. 4. In this latter orientation the face 9 of the uppermost secondary sheet US is presented for marking so that a duplicate of that marking will be formed on the upper face, in FIG. 4, of the immediately underlying primary sheet P while the barrier sheet 6 inserted as illustrated to prevent additional duplicates being formed between secondary sheets US and primary sheets P which underlie that barrier sheet. Following use of the uppermost secondary sheet US in the stack shown in FIG. 4, that sheet can have its portion 20 torn away from the book along the perforations 10 and the primary sheet P in the set can be turned on the ring binding 1 (together with the stubs remaining of the two secondary sheets in that set) to present a further secondary sheet US for duplicating purposes. By this technique the successive secondary sheets US in the stack on the binding ring 1 can be used for duplicating purposes with the barrier sheet 6 being re-located as appropriate. Eventually only primary sheets P together with stubs remaining of the removed secondary sheets OS and US will remain on the ring binding 1 to provide duplicates on each face of the primary sheets of the various markings which lave been applied to the secondary sheets.

It will be appreciated that the sequence in which the sheets in the sets A are used for duplicating purposes and as described with reference to FIGS. 3 and 4 is given by way of example only and that the sheets in the respective sets may be used in a different sequence as convenient to a person utilising the book.

A main use intended for the book is for noting telephone messages where the relevant secondary sheet OS or US is torn from the book with the message applied and presented to the intended recipient while a record of that message is duplicated on a face of the primary sheet P. With such telephone message books it is likely that each secondary sheet will be sub-divided in conventional manner into, say, three message portions by perforated lines of weakness 10A (as shown in FIG. 1) so that each message portion can be torn from the book while the duplicate messages from the same secondary sheet are developed on a single common primary sheet P.

Where each secondary sheet OS and US carries a region of low tack adhesive 21 (see FIGS. 3 and 4) by which that sheet or a portion thereof may temporarily be secured to a receptive surface remote from the book, it is preferred that the faces of the primary sheet P carry zones of a release agent, such as localised silicone layers, which underlie the low tack adhesive 21 and permit that adhesive 21 to be readily removable with the secondary sheet portion carrying it from the primary sheet P in its set. It will be appreciated that the regions of low tack adhesive 22 in the spine part 2 of the book can be replaced by a conventional gum or adhesive which retains the sheets together as discrete sets A.

I claim:

1. A method of manufacturing a record book and comprising the following steps, providing record sheets and secondary sheets, binding said record and secondary sheets to provide a spine, arranging said record sheets and secondary sheets in overlying relationship such that a face of a secondary sheet opposes a face of an adjacent record sheet, providing a reactive coating of duplicating material to said opposing faces of said record and secondary sheets, applying pressure to the secondary sheet causing the reactive coatings on the adjacent opposed faces of the secondary and record sheets to inter-react and thereby, providing a copy of the mark or impression so applied on the face of the record sheet, forming said record and secondary sheets in sets such that each set includes a record sheet and two secondary sheets, providing reactive coating on one face only of each of said two secondary sheets of said sets so that the two secondary sets have said one faces that are adjacent to and oppose the faces of the record sheet so provided with said reactive coating that, applying pressure on a first secondary sheet in this set transfers that marking through the first secondary sheet, causing the reactive coatings between one face of the record sheet and the opposing face of the first secondary sheet to inter-react, providing a copy of that marking on said one face of the record sheet, said pressure applying step on a second secondary sheet achieving transfer of that marking through the second secondary sheet thereby, causing the reactive coating between the second face of the record sheet and the opposing one face of the secondary sheet to inter-react thereby, providing a copy of that marking on the second face of the record sheet, retaining said record sheets in the book.

2. The method according to claim 1 further including the step of providing a line of weakness adjacent to the spine of the book to facilitate removal of those portions of each secondary sheet from the spine of the book.

3. The method according to claim 1 further comprising the step of applying to each secondary sheet having such a reactive coating a region of low tack adhesive, whereby that secondary sheet or portion thereof having such a low tack adhesive can be conveniently adhered temporarily to a receptive surface.

4. The method according to claim 3 further including the step of applying to each face of the record sheet a localized release agent to underlie the low tack adhesive carried by the adjacent secondary sheet in the set.

5. The method according to claim 1 further including the step of applying an adhesive to secure the record sheets and secondary sheets of a set together along common edges.

6. The method according to claim 3 further including the step of applying to each secondary sheet having said reactive coating region of low tack adhesive, said region low tack adhesive being provided in the spine of the book whereby said record and second secondary sheets are secured together in sets along a common edge thereby forming discrete sets, and whereby each region of low tack adhesive remains in the spine of the book particularly when portions of the secondary sheets are so removed from the book.

7. A method of manufacturing a record book which comprises forming record sheets each of which record sheet has both faces thereof provided with a reactive coating of duplicating material; forming secondary sheets each of which secondary sheets has a single face thereof provide with a reactive coating of duplicating material;

collating the record sheets and secondary sheets into sets, each set having a record sheet and two secondary sheets in overlying relationship and in each set positioning the record sheet between the two secondary sheets with the single face of each secondary sheet having said reactive coating being disposed adjacent to and opposing a face of the record sheet having said reactive coating whereby application of a mark by pressure on a first secondary sheet in a set causes pressure transfer of that marking through said first secondary sheet and the reactive coatings between one face of the record sheet in said set and the opposing face of said first secondary sheet to inter-react and provide a copy of that marking on said one face of the record sheet and application of a mark by pressure on the second secondary sheet in said set causes pressure transfer of that marking through said second secondary sheet and the reactive coatings between the second face of the record sheet in said set and the opposing face of said second secondary sheet to inter-react and provide a copy of that marking on said second face of the record sheet; collating several said sets in overlying relationship and binding, said sets together at a spine part of the book.

8. A method as claimed in claim 7 which comprises providing each secondary sheet with a line of weakness adjacent to the spine part for facilitating removal of portions of said secondary sheets from the spine part and the book.

9. A method as claimed in claim 8 which comprises applying to each secondary sheet on its face having said reactive coating a region of low tack adhesive by which, when a said portion of that secondary sheet having the low tack adhesive is removed from the book, it may temporarily be adhered to a receptive surface.

10. A method as claimed in claim 9 which comprises applying to each face of the record sheet a localized release agent to underlie said low tack adhesive carried by the secondary sheets in the set with that primary sheet.

11. A method as claimed in claim 7 which comprises gumming or adhesively securing the record and secondary sheets of a set together along common edge parts thereof in the spine part to form a discrete set.

12. A method as claimed in claim 8 which comprises applying to each secondary sheet on its face having said reactive coating a region of low tack adhesive which is located in the spine part of the book to secure the record and secondary sheets of a set together along common edge parts thereof to form a discrete set and which region of low tack adhesive remains in the spine part when said respective portions of the secondary sheets are removed from the book.

13. A method as claimed in claim 9 which comprises applying said region of low tack adhesive as a strip extending adjacent to said line of weakness.

14. A method as claimed in claim 7 which comprises binding the sets together for each sheet set to be capable of turning about the binding through substantially 360 degrees into back-to-back relationship with respect to further sheet sets of the book to successively present sheets of a further set for use.

15. A method as claimed in claim 7 which comprises providing a barrier sheet which is displaceable for use in successive sets in the book and is capable of interposition between a record sheet and said secondary sheet in a set during application of a mark to the first secondary sheet of that set to alleviate pressure transfer from that mark between the record sheet and the said second secondary sheet for alleviating the development of a marking on the second face of the record sheet.

* * * * *